United States Patent [19]

Freedman

[11] 3,710,895

[45] Jan. 16, 1973

[54] CART WITH BRAKE AND RETENTION SYSTEM

[75] Inventor: Stuart I. Freedman, Los Angeles, Calif. 90046

[73] Assignee: Walter-Kidde & Company, Inc., Clifton, N.J.

[22] Filed: Sept. 18, 1970

[21] Appl. No.: 73,563

[52] U.S. Cl. ..........................188/5, 188/2 R, 188/32
[51] Int. Cl. ................................................B60t 1/14
[58] Field of Search ......180/47.34, 150.5; 188/5, 19, 188/21, 23, 32, 2 R

[56] References Cited

UNITED STATES PATENTS

| | | | |
|---|---|---|---|
| 2,703,632 | 3/1955 | Gambardella | 188/5 |
| 3,042,150 | 7/1962 | Lukawsky | 188/5 X |
| 3,216,531 | 11/1965 | Hutchinson | 188/5 |
| 607,329 | 7/1898 | Beebe | 188/21 X |
| 703,818 | 7/1902 | Plattenburg | 188/40 |
| 3,313,377 | 4/1967 | Aninger | 188/5 |

*Primary Examiner*—Duane A. Reger
*Attorney*—Golove and Kleinberg, Leonard Golove and Marvin H. Kleinberg

[57] ABSTRACT

A food serving cart with a combined brake and retention system where the brake system includes four brake arms which are normally in a restraining position until purposefully released and which cause a portion of the cart to be lifted if the cart should move undesirably, and where the retention system includes two pivotable abutment elements for engaging a projection attached to a base such as the floor of an aircraft interior. The brake and retention system is simply operated by pivoting a handle located about waist high to a first position to release the brake arms and to a second position to pivot the abutment elements to disengage the projection.

17 Claims, 17 Drawing Figures

Stuart I. Freedman,
INVENTOR.
BY.

GOLOVE & KLEINBERG,
ATTORNEYS.

Stuart I. Freedman,
INVENTOR.
BY

GOLOVE & KLEINBERG,
ATTORNEYS

Stuart I. Freedman,
INVENTOR.

BY

GOLOVE & KLEINBERG,
ATTORNEYS.

PATENTED JAN 16 1973

Stuart I. Freedman,
INVENTOR
BY

GOLOVE & KLEINBERG,
ATTORNEYS.

CART WITH BRAKE AND RETENTION SYSTEM

BACKGROUND OF THE INVENTION

1. Field of the Invention

The present invention relates to a brake and retention system and more particularly to a brake and retention system for a cart such as a food or beverage serving cart.

2. Description of the Prior Art

With the advent of large passenger aircraft capable of transporting three to four hundred or more passengers, new problems of effectively serving these passengers have arisen. On older, smaller aircraft passengers were served meals, for example, by stewardesses who carried individual trays of food to individual passengers. More recently small serving carts have been used for serving beverages and the like and comprised several open shelves; these carts were foldable for storage when not in use. These prior serving techniques have been found to be too slow and inefficient for serving large numbers of people.

Any system having wheels which contemplates usage in an aircraft environment must be uniquely designed. A major consideration is that the floor of an aircraft is not a stationary platform but rather a platform having changes in attitude depending upon the attitude of the aircraft. Such changes relative a vertical reference line (gravity) make any system with wheels a potential danger to passengers as well as the aircraft itself. In addition, any system which is designed must take into consideration at least three major usage criteria required of a serving system during the flight of an aircraft. First, the system must be efficient within the passenger compartment when used to actually serve passengers. Secondly, the system must be efficient when being loaded or unloaded in the kitchen or galley of an aircraft. Third, any system must be capable of being effectively stored within the aircraft so as to not create any potential hazard or consume excessive space. In addition, any system developed must be structurally sound as well as being light in weight. Of course, any system developed must also be capable of economical manufacture.

SUMMARY OF THE INVENTION

All of the above disadvantages of the prior art and requirements engendered by aircraft usage have been obviated by the present invention which provides for a cart having a brake and retention system comprising a shaft adapted to be rotatably connected to a base of the cart; a brake arm pivotably mounted to the shaft, the arm having an extended end for selectively, frictionally engaging a cart supporting surface; an abutment element mounted to the shaft and pivotable between a lower locking position and an upper release position, said abutment element for abutting a securing projection when in said lower locking position; biasing means connected to the brake arm for biasing the brake arm to have the end frictionally engage the cart supporting surface; biasing means connected to the abutment element for biasing the abutment element to the lower locking position; means connected to the shaft for transmitting rotational motion to the shaft; and handle means connected to the motion transmitting means for pivoting the brake arm to disengage the arm from the cart supporting surface and for pivoting the abutment element to its upper release position. The present invention additionally relates to the brake system and the retention system individually, to a novel cable adjustment mechanism, to a door latch, and to an extruded panel connector. The door latch comprises a hooked portion for being connected to a ridge of the cart; a shaft for moving the hooked portion into and out of connection with the ridge, the shaft being retractable into the door; and a spring positioned about the shaft for biasing the shaft into the door whereby the hooked portion is movable from a position flush with the door to a position connected to the ridge. The extruded panel connectors for connecting two panels at substantially right angles comprise a first connector element adapted to be connected to a first panel, the element having a hook extending perpendicular to the position of the first panel when connected and a second portion extending parallel to the first panel when connected; and a second connector element adapted to be connected to a second panel, the element having a first portion extending parallel to the second portion of the first connector hook for abutting the first connector, the second connector first portion forming one leg of a generally U-shaped portion for receiving the second portion of the first connector hook. The cable adjustment mechanism may form part of a comprehensive brake and retention system and generally comprises first and second tubular members having outer, generally cylindrical surfaces, each tubular member adapted to engage the other along abutting ends where the abutting ends lie along a plane disposed oblique to the longitudinal axes of the abutting members; a wheel connected to the first tubular member at the other of its ends; and a threaded bolt extending through the first and second tubular members.

An object of the present invention is to provide an efficient and economic cart system to be used to service large numbers of people.

Another object of the present invention is to provide a cart which can be used safely in aircraft.

Still another object of the present invention is to provide a cart having a reliable, simply constructed and operated brake system and a cart having a reliable, simply constructed and operated retention system as well as a cart having an integrated brake and retention system.

Still another object of the present invention is to provide a cart having a brake system which is in a brake mode until purposefully released.

Yet another object of the present invention is to provide a cart having a retention system which cooperates with a rigid securing projection to anchor the cart until purposefully released.

Another object of the present invention is to provide a cart having a reliable door latch which can be quickly and easily operated to hold open a cart door.

Still another object of the present invention is to provide a cart which is structurally sound and where panel members are connected by light weight but strong and economically produced connectors.

DETAILED DESCRIPTION OF THE PREFERRED EMBODIMENTS

While the present invention is susceptible of various modifications and alternative constructions, illustrative embodiments are shown in the drawings and will herein be described in detail. It should be understood, however, that it is not the intention to limit the invention to the particular forms disclosed; but on the contrary, the intention is to cover all modifications, equivalents and alternative constructions falling within the spirit and scope of the invention as expressed in the appended claims.

Figures 1, 2, 7, 11:
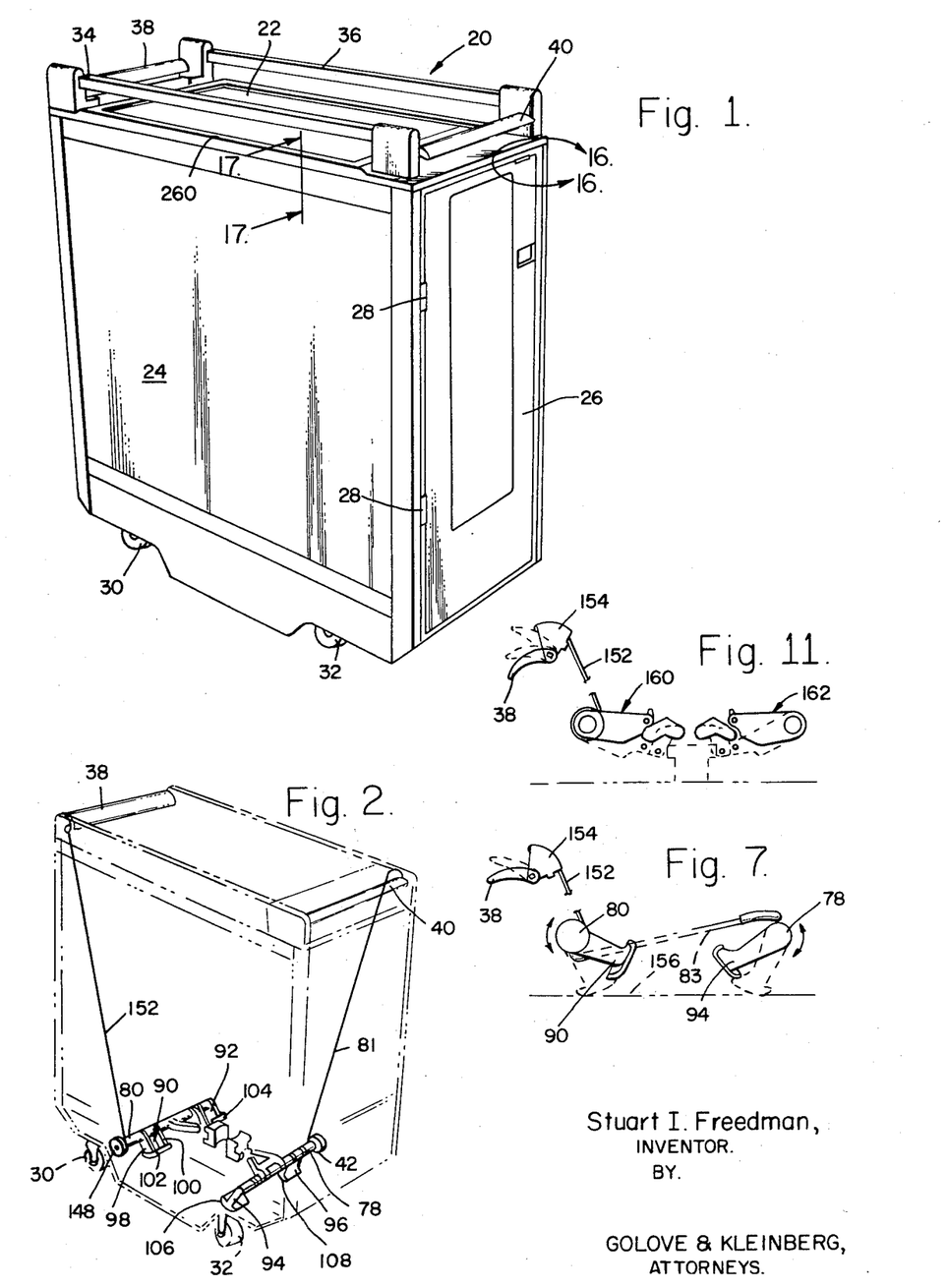
FIG. 1 is a perspective view of a serving cart.
FIG. 2 is a perspective view of the brake and retention system with the cart illustrated in phantom lines.
FIG. 7 illustrates the brake engagement and the brake release positions of the brake system.
FIG. 11 is an elevational view illustrating the two positions of the retention system.

Referring now to FIG. 1, there is illustrated a serving cart 20. The cart is in the form of a food or beverage serving vehicle to be used on a passenger aircraft such as the Boeing 747, the Lockheed L-1011 and the McDonnell-Douglas DC-10. The cart is generally "box" shaped having a top panel 22, two side panels of which only side panel 24 is shown and two end panels of which only a door end panel 26 is shown. The door end panel is connected to a pair of hinges 28 which allow the door to rotate through 270° so that it can come to a position adjacent the side panel 24. Connected to a base 29 (FIG. 5) of the cart is a set of four wheels 30, 31, 32 and 33; the wheels 30 and 32 are visible in FIG. 1. Along the side of top panel 22 are two side guard rails 34 and 36 and two operating handles 38 and 40. The handles are placed in a position about waist high for ease of operation, and the width of the cart is designed to allow passage along an aisle of an aircraft. The particular cart illustrated has a number of interior brackets (not shown) to hold a plurality of trays such as food trays to allow quick and efficient handling by the stewardesses.

It is to be understood that while the preferred embodiment of the cart is designed for passenger aircraft use, similarly designed or equivalent carts or vehicles can be used in other than aircraft environment; for example carts of the type described herein may be used in large banquet halls. Modified carts or different variation may be used in other environments such as hospitals.

Figure 3:
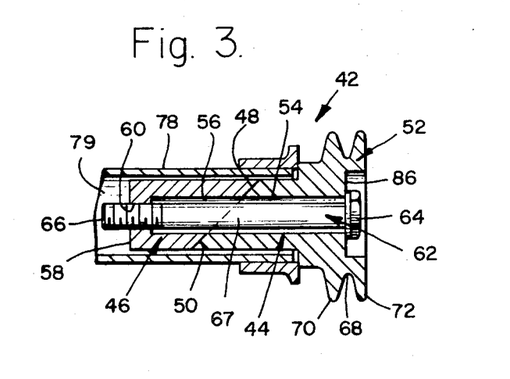
FIG. 3 is an elevational, sectional view of cable adjustment mechanism.
Figures 4, 9, 10:
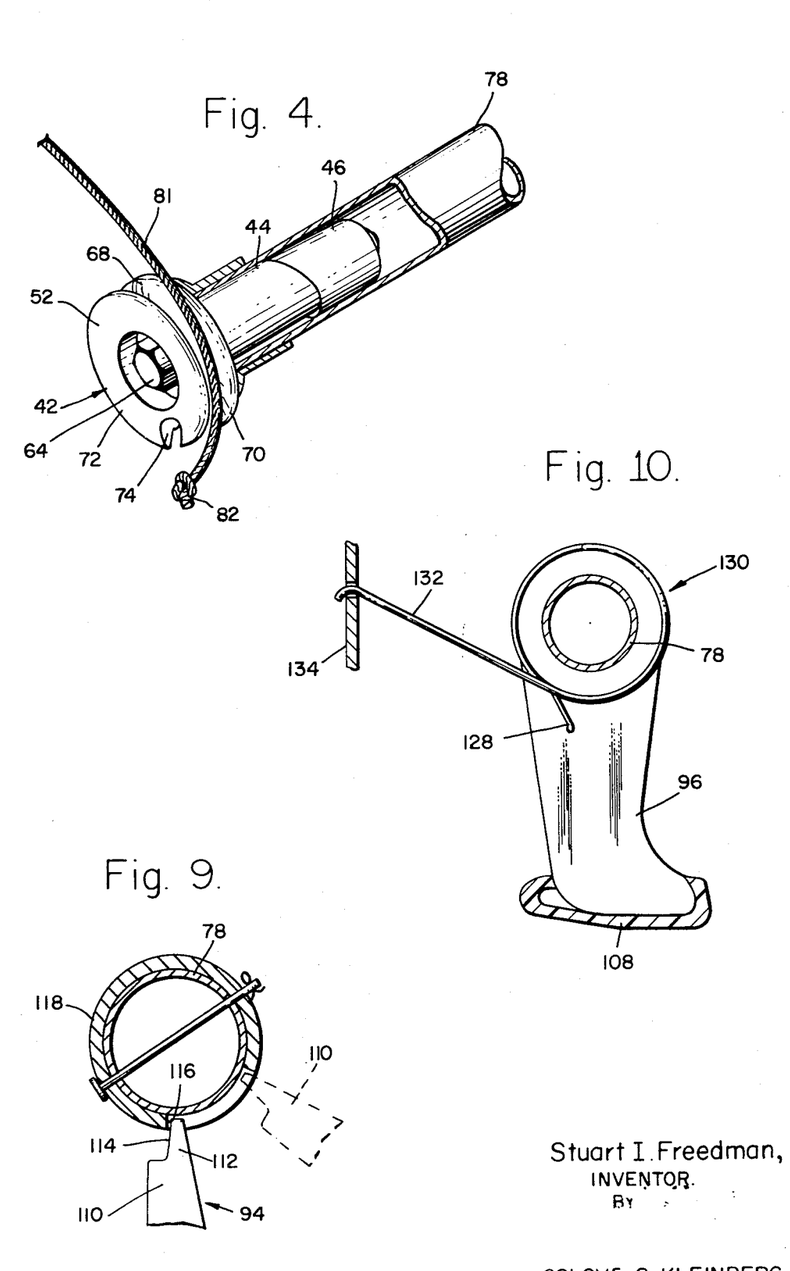
FIG. 4 is a perspective view of the cable adjustment mechanism of FIG. 3, connected to a shaft.
FIG. 9 is an elevational sectional view taken along line 9—9 of FIG. 8.
FIG. 10 is an elevational sectional view taken along line 10—10 of FIG. 5.

In accordance with one of the more important aspects of the present invention, provision is made for adjusting a cable control which connects the handles 38 and 40 to the brake and retention system as will be described hereinbelow. A cable adjustment mechanism allows the cable to be maintained in a taut condition so that quick and responsive operation of the brake and retention system is achieved. In addition, any adjustment to be made can be done quickly and easily with a minimum of effort. Referring now to FIGS. 3 and 4, a preferred embodiment of a cable adjustment mechanism 42 is illustrated and comprises a first tubular member 44 and a second tubular member 46. The first tubular member 44 has a first end surface 48 abutting a first end surface 50 of the second tubular member 46 and an opposite end portion integral with a wheel 52. The first tubular member 44 has a central opening 54 which is generally alignable with a central opening 56 in the second tubular member. Adjacent the second end 58 of the second tubular member, an interior wall 60 is threaded so as to engage a threaded portion 66 of an elongated bolt 62 which is positioned within the central openings 54 and 56. The bolt includes a hexagonal head 64 and a partially threaded shank 67. The wheel 52 is in the form of a pulley wheel having a circumferential groove 68 flanked by two circumferential rims 70 and 72. Each of the rims has a recess of which only the recess 74 in the rim 70 is shown in FIG. 4.

As illustrated in FIG. 3, the cable adjustment mechanism is to fit within a shaft 78 having at least a partial hollow portion such as the portion 79 to receive the mechanism. As will be explained hereinbelow the shaft 78 acts as a torque transmission device to operate portions of the brake and retention system.

Figure 5:
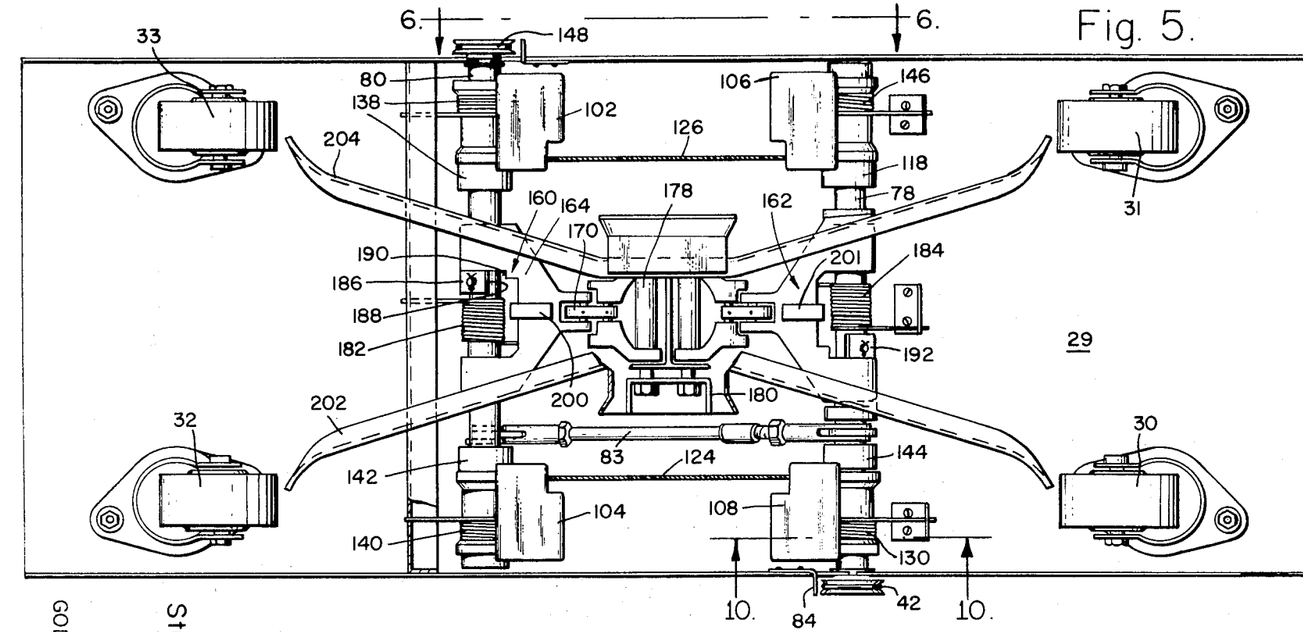
FIG. 5 is a bottom view partially broken away of the cart shown in FIG. 1 and illustrates the base of the cart and portions of the brake and retention system.

In operation, a cable 81 having one knotted end 82 is placed within the circumferential groove 68 of the pulley wheel 52. The knot 82 is placed outside of the circumferential groove so that it lies immediately adjacent the recess 74. During this time, the bolt 62 is in a loosened condition relative the tubular members 44 and 46 so that the pulley wheel can be rotated until the cable is taut. The other end of the cable as mentioned earlier is connected to one of the two handles 38 or 40, FIG. 1. A pulley guide 84, FIG. 5, is provided to retain the cable in the circumferential groove. Once the cable is taut, the head 64 of the bolt is rotated until the cable adjustment mechanism is held in a tight fit within the hollow 79 of the shaft 78.

To create the tight fit, attention is drawn to the end surface 48 of the first tubular member 44 and the end surface 50 of the second tubular member 46. It is noted that both of the ends lie along a plane which is generally oblique to the longitudinal axes of the tubular members of the bolt. Since the bolt is threadedly engaged with a portion of the second tubular member only and since the head of the bolt is positioned to abut an end surface 86 of the tubular member 44, upon tightening the bolt relative the second tubular member, a lateral is created which allows the tubular members to slip relative each other along the end surfaces 48 and 50. The slipping or movement will continue until the tubular members abut against the interior wall of the shaft 78 as shown in FIG. 4. It is understood that the abutment of the first tubular member 44 will occur about 180° from the abutment of the second tubular member 46; regardless of the exact location of abutment, a high friction interference is established between the tubular members and the shaft to lock the tubular members into the tightened position. Should the cable stretch with prolonged usage or due to climatic conditions, the cable can easily be made taut again by simply loosening the bolt, rotating the pulley wheel until the cable is taut, and once again tightening the bolt to create the frictional interference between the tubular members and the shaft.

In accordance with another important aspect of the present invention, provision is made for restraining the cart until there is a desire for the cart to be moved. Restraining the cart is automatically accomplished by the inventive brake system while releasing the cart and providing a force to move the cart can be easily and quickly achieved. The brake system has two restraining modes; unwanted movement of the cart will automatically cause the brake system to change from one mode to the other mode to stop further movement. Referring now to FIGS. 2 and 5, the brake system includes two shafts 78 and 80, each of which is at least partially hollow so that each can receive a cable adjustment mechanism such as described hereinabove with regards to FIGS. 3 and 4. The shafts act as torque transmitters to provide the rotation necessary for the operation of the preferred embodiment of the brake system. The shafts are attached to the base 29 of the cart so as to be rotatable relative the base. Pivotally connected to each shaft is an elongated rod 83 which causes rotation of one of the shafts when the other shaft is rotated. This is more clearly shown by reference to FIG. 7 where the elongated rod 83 is connected to the shaft 78 and positioned about 180° out of phase with the connection of the rod to the shaft 80. Thus, when the shaft 80 is rotated in a counter-clockwise direction, the shaft 78 is caused to rotate in a clockwise direction; in a similar fashion, if the shaft 80 is rotated at a clockwise direction, then the shaft 78 is rotated at a counter-clockwise direction. Also, if the shaft 78 is rotated, the rod 83 causes the shaft 80 to be rotated in an opposite direction.

The brake system additionally includes four brake arms 90, 92, 94 and 96 each of which is mounted so as to rotate about one of the shafts. The brake arms 90 and 92 are mounted to the shaft 80 while the brake arms 94 and 96 are oppositely disposed and mounted to the shaft 78. Each brake arm includes two support members such as the support member 98 and 100 of the brake arm 90. In addition, each of the brake arms has an extended end such as the pad 102 of the brake arm 90 which extends to frictionally engage the floor or other cart supporting surface and acts as a restraint to movement of the cart. Brake arm 92 includes the pad 104, brake arm 94 includes the pad 106 and brake arm 96 includes the pad 108.

Figure 8:
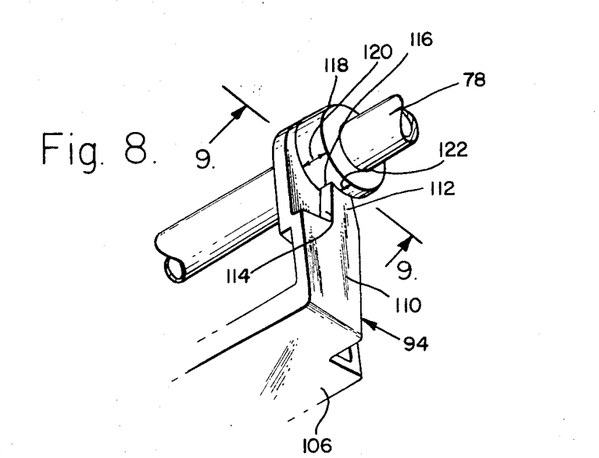
FIG. 8 is a perspective view of a portion of the brake system.

Referring now to FIG. 8, the brake arm 94 is shown in more detail and includes a support member 110 having an extending shoulder 112 which forms an abutment surface 114. The support member 110 has an opening (not shown) through which the shaft 78 is located; each of the other brake arms are similarly mounted to their respective shaft and each includes an abutment surface. In order to pivot the brake arms clutch rings are located adjacent each of the brake arms. For example, clutch ring 118 is located immediately adjacent the brake arm 94 and has a corresponding abutment surface 116, FIG. 9, to come into contact with the abutment surface 114 of the shoulder 112. The annular clutch ring has a narrow width and a wide width portions which allow the formation of the abutment surface 116, the surface being contiguous with each of the narrow width portion and the wide width portion. For purposes of designation, two arrows have been placed in FIG. 8 to indicate the two width portions and are designated 120 and 122 to indicate respectively the wide width portion and the narrow width portion. As more clearly illustrated in FIG. 9, the narrow width portion extends for an angular distance somewhat greater than 60° which allows movement of the brake arm through most of the angular distance without interference from the clutch ring 118. Since the clutch ring is securely fastened to the shaft, any rotation of the shaft causes the clutch ring to rotate; when the shaft 78 rotates in a counter-clockwise direction the abutment surface 116 will come into engagement with the abutment surface 114 and cause the brake arm 94 to also rotate in a counter-clockwise direction. In a similar fashion, each of the other brake arms are pivotable about its respective shaft by a clutch ring, for example, clutch ring 138 for the brake arm 90 (pad 102), clutch ring 142 for the brake arm 92 (pad 104) and clutch ring 144 for the brake arm 96 (pad 108). An advantage of the engaging abutment surfaces is that contact is over a relatively large area so wearing characteristics of the brake system is greatly enhanced. Operation of the full brake system will be described hereinbelow.

Referring once again to FIG. 5, a flexible cord 124 connects the oppositely disposed brake arms 92 and 96 which are hidden by their respective pads 104, 108. In a like manner, the brake arms 94 and 98 are connected by a flexible cord 126 and are also hidden from view by their respective pads 102, 106. Thus, certain movements by one of the connected brake arms causes movement by the other of the connected brake arms.

Each of the brake arms is biased to a generally vertical position by a torsion spring such as illustrated in FIG. 10 where the brake arm 96 is connected to an end portion 128 of a torsion spring 130 having a number of loops while the other end portion 132 is attached to a restraining tab 134. In turn, the restraining tab is attached to the base 29. In a similar fashion, each of the other brake arms is attached to a corresponding torsion spring, for example, the torsion spring 136 to the brake arm 90 (pad 102), the torsion spring 140 to the brake arm 92 (pad 104) and the torsion spring 146 to the brake arm 94 (pad 106).

Referring once again to FIG. 2 and 5, the shaft 78 has attached at one end the cable adjustment mechanism 42 while the shaft 80 has attached at an opposite end a cable adjustment mechanism 148. The cable adjustment 42 is in turn attached to the cable length 81 which is in turn connected to the handle 40. The cable adjustment 148 is attached to a cable length 152 which in turn is connected to the handle 38 through a link 154, FIG. 7. The handles 38, 40 are elongated and disposed horizontally with each handle being pivotally mounted to the upper portion of the cart 20. In FIG. 7, the pivotal positions of the handle 38 are illustrated.

Figure 6:
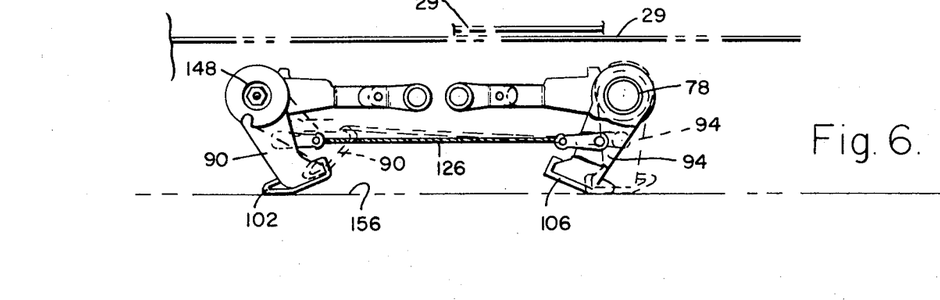
FIG. 6 is an elevational view of a portion of the brake system taken along lines 6—6 of FIG. 5 and in addition illustrates in phantom line the brake system in a cart lifting position.

In the usual at rest position, the brake arms are positioned as shown in solid line in FIG. 6 and phantom line in FIG. 7. Thus, a portion of the pads 102 and 106 of the brake arms 90 and 94, respectively, are in contact with a cart supporting surface 156 in FIG. 6 which is indicated by a phantom reference line. If it is desired to release the brake arm so as to allow movement of the cart one of the handles such as handle 38 is pivoted downwardly as shown in FIG. 7 from the broken line position to the solid line position. This causes the cable 152 to be moved upwardly rotating the shaft 80 in a counter-clockwise direction; the brake arm 90 is rotated in a counter-clockwise direction while the rod 83 causes the shaft 78 to be rotated in a clockwise direction to cause the brake arm 94 to be rotated in a clockwise direction. As is apparent, the oppositely disposed brake arms pivot upwardly toward each other and away from the cart supporting surface 156 so that a push or pull on the cart will cause it to move. However, because the torsion springs are set to bias the brake arm into frictional engagement with the cart supporting surface, if the pivoting force is relieved from the handle 38 the brake arms will once again pivot into frictional engagement with the cart supporting surface.

For most purposes, the frictional engagement by the four brake arms as shown in FIG. 6, is sufficient to keep the cart in a stationary position even though only a portion of the pads actually make contact with the surface 156. If, however, the aircraft makes a sudden change in attitude causing a force pattern to be set up overcoming the frictional force established by the brake arms, upon movement of the cart in either of two directions, that is either with the handle 38 being at the front of the cart or the handle 40 being at the front of the cart, there is a further rotation of the brake arms on one of the shafts to cause a lifting of what would be the trailing end of the cart to disengage two of the four wheels from the surface 156 and to create a much greater frictional engagement between two of the brake arms and the surface 156. For example, should the cart begin moving to the left the brake arms 94 and 96, FIGS. 2 and 6, (brake arm 96 is not shown in FIG. 6) will rotate from the position shown in solid line in FIG. 6 to the position shown in phantom line. It is noted that the shaft 78 is raised as is the base 29 of the cart causing the wheels 30 and 31 to disengage from the surface 156. In addition the pads 106 and 108 more fully engage the surface 156 to greatly increase the frictional force upon the moving cart. Because of the flexible cords 124, 126, the oppositely disposed brake arms 90 and 92 rotate to a position as shown in phantom line for the brake arm 90; in this portion the brake arms 90, 92 no longer engage the surface 156. Nevertheless, the engagement of the brake arms 94 and 96 is sufficient to stop and prevent further movement of the cart.

Referring once again to FIG. 8, the brake arm 94 is shown in a restraining position. To cause the brake arm to release the cart, the shaft 78 is rotated in a counter-clockwise direction so that the abutment surface 116 contacts the abutment surface 114 and pivots the brake arm to its upward position out of contact with the surface 156. If the force on the handle is released, the torsion spring will cause the brake arm to return to its frictional engagement with the cart supporting surface which in turn will cause the abutment surface 114 to contact the abutment surface 116 and cause the shaft to rotate in a clockwise direction. Should unwanted movement of the cart occur in one direction causing the brake arm to rotate to its cart lifting position, the abutment surface 114 will again engage the abutment surface 116 and rotate the shaft slightly. Unwanted movement of the cart in an opposite direction will rotate the oppositely disposed brake arms to a cart lifting position while causing the brake arm 94 to be pulled by the cord 126 along the narrow width portion of the clutch ring 118 thereby rotating the brake arm to its upward position. It is noted that the clutch ring does not interfere with the pivoting of the brake arm.

In accordance with another important aspect of the present invention, provision is made for retaining the cart in a predetermined position for purposes of storage or loading and unloading. This is accomplished by a retention system which is simply constructed, highly reliable and easily operated. Referring to FIG. 5, the shafts 78, 80 form part of the retention system by also acting as a means to transmit rotational movement from the handles 38, 40 to other portions of the retention system. In order to be securely locked in position, aircraft on which the inventive cart is to be used are provided with a number of securing projections rigidly mounted to a portion of the aircraft and projecting a slight distance above the surface 156 to allow the cart to be firmly secured thereto. To accomplish this, each of the shafts are connected to abutment elements, such as the abutment element 160 pivotally mounted to the shaft 80 and the abutment element 162 pivotally mounted to the shaft 78.

Figure 12:
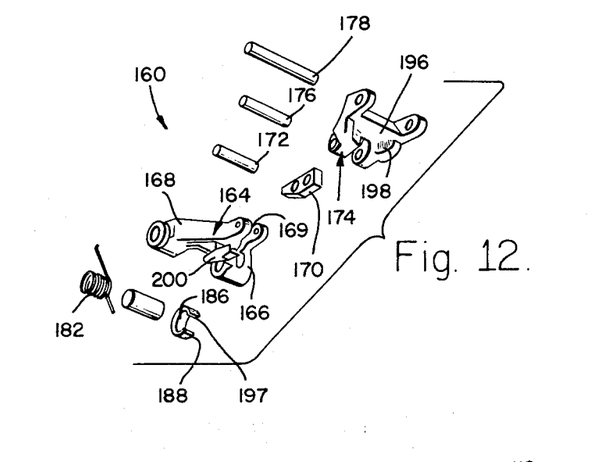
FIG. 12 is an exploded perspective view of a portion of the retention system.

As shown in more detail in FIG. 12, the abutment element 160 includes three links of which the main link or projection activated arm 164 is directly mounted to the shaft 80 with two legs 166, 168 each having openings to receive the shaft. The two legs converge to form a small U-shaped channel 169 which receives a portion of a double pivoting connecting link 170 and is pivotally connected thereto by a pin 172 which connects the connecting link to the projection activated arm through aligned openings. The connecting link 170 is also pivotally connected to a projection engagement link 174 by a second pin 176, which also fits through aligned openings in the projection engagement link and the connecting link. The projection engagement link is additionally pivotally connected by a small shaft 178 to a bracket 180, FIG. 5, directly attached to the base 29. With the articulated linkage described both the projection activated arm 164 and the projection engagement link 174 are constrained to pivot about axes fixed relative the cart; the connecting link 170 pivots relative both the projection activated arm and the projection engagement link. The abutment element 162 is identically constructed and is oppositely disposed from the abutment element 160.

Each of the abutment elements are attached to torsion springs such as the torsion spring 182, FIG. 5, connected to the projection activated arm 164 and the torsion spring 184 connected to the abutment element 162. In addition, each abutment element is pivoted by an adjacent clutch ring in a similar fashion to that described for each of the brake arms. Without going into repetitive and excessive detail, a clutch ring 186 is securely fastened to the shaft 80 and has an abutment surface 188 which is positioned to come into contact with a shoulder 190 forming an abutment surface on the projection activated arm 164. In a similar fashion, a clutch ring 192 is securely fastened to the shaft 78 and is positioned to come into contact with the abutment element 162 in a predetermined manner. Each of the clutch rings 186, 192 allows a predetermined amount of rotation of the respective shaft without engagement of the abutment element.

Figure 13:
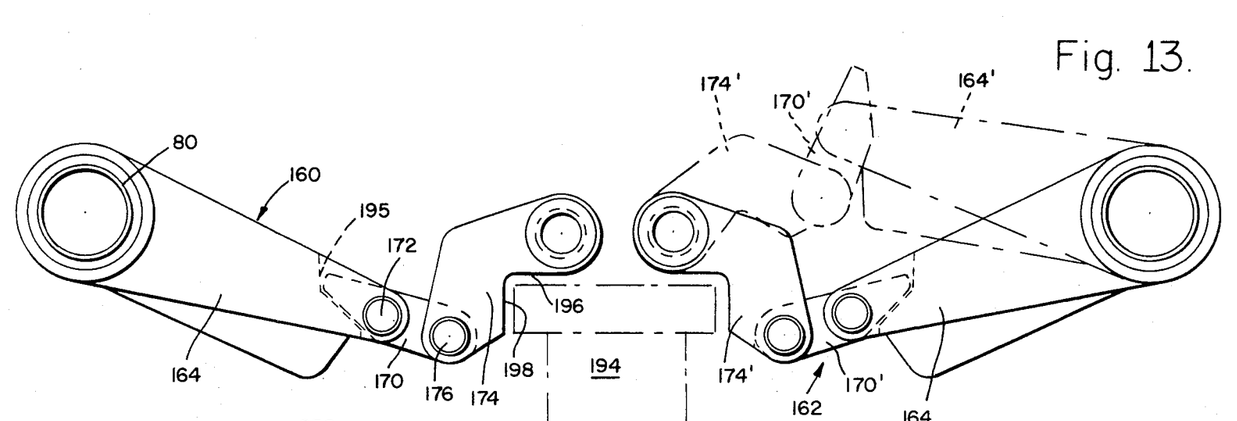
FIG. 13 is an enlarged view of a portion of the retention system shown in FIG. 11 and illustrating in solid line the lower locking position and in phantom line the upper release position of the retention system.

Referring now to FIG. 13, there is illustrated in phantom line a securing projection 194 which has a generally T-shaped cross section. In actuality, the cross member of the T is an annular plate; the projection engagement link, therefore, forms a mating recess 196 including an annular wall 198 for coming into engagement with the securing projection (see FIG. 12 also). The abutment elements are pivotable between two positions, a lower locking position (as shown in solid line in FIG. 13) and an upper release position (as shown in phantom line for abutment element 162 in FIG. 13). In the lower locking position, any movement of the cart will cause the securing projection 194 to come into abutment with the projection engagement link 174 (or 174') so that further movement is prevented. However, when the abutment element is pivoted to its upper release position, all portions of the abutment element are raised to a level higher than that of the securing projection so that the cart may be moved away from the securing projection without interference. It is to be noted that an internal shoulder, FIG. 13, is provided as part of the projection activated arm 164 to engage the connecting link 170 in the lower locking position. This abutting engagement prevents any further pivoting in a downward direction of the abutment element 160. The abutting engagement also acts as a stop to rotation of the shaft 80 by transmitting the stopping force through the clutch ring 186, abutment surface 197, to another abutment surface (not shown) on the projection activated arm 164. (The shaft 78 is restrained in an identical manner.) This shaft stopping force is also used to stop rotation of the brake arms in the cart lifting position by having the abutment surface 114, FIG. 8, engage the abutment surface 116. Since the shaft 78 is stopped, the abutting brake arm 94 is stopped.

Referring to FIG. 11, the two positions of the abutment elements are illustrated once again in both the lower locking position and the upper release position. The positions of the handle 38 are also illustrated during the various positions of the abutment elements. In the usual at rest position with the handle 38 being in its uppermost position as shown in dotted line in FIG. 11, the brake system is engaged with the surface 156 as already mentioned, and the retention system is in its lower locking position whether or not the cart is in locking engagement with the securing projection. When the handle 38 is pivoted downwardly to the middle position shown in dotted line in FIG. 11, the brake system is released; however, no change occurs to the retention system, so that if the cart is in a locked position relative a securing projection, the cart will not be movable. If, however, the cart was being restrained away from a securing projection, then the cart will be free to be moved even though the retention system would be in a lower locking position due to the biasing action of the torsion springs 183, 184. If the cart is in a locked position about a securing projection, the handle 38 must be pivoted to the third position, shown in solid line in FIG. 11, which causes the clutch rings 186, 192 to engage respectively the abutment elements 160, 162 to cause them to pivot to the upper release position. It is noted that during the earlier partial rotation of the shaft, the slip rings did not come in contact with the abutment elements because of their predetermined placement. As with the brake arms, the abutment elements will be biased by the torsion springs to the lower locking position as soon as the pivoting force is removed from the handle 38 so that only during the time that the handle is pivoted to its third position are the abutment elements in their upper release position.

Since the retention system is biased toward the lower locking position, a mechanism is provided to allow the system to momentarily move to its upper release position when it is desired to secure the cart to the securing projection. Each of the abutment elements has a depending plastic covered projection, such as the projection 200 of the projection activated arm 164, FIG. 12, and the projection 201 of the abutment element 162, FIG. 5, which is in a position to abut the cross member of the securing projection 194, FIG. 13. This is accomplished simply by moving the cart over a securing projection which will engage one or the other of converging guide flanges 202, 204, FIG. 5, until contact is made with the projection 200 or projection 201. Further, movement of the cart will cause the securing projection 194 to pivot the arm 164 which in turn causes the projection engagement link 174 to be pivoted to allow the receipt of the securing projection (or if coming from a different direction, the abutment element 162 is pivoted). Once the securing projection passes beyond the plastic covered projection 200 or 201, the torsion springs will snap the projection engagement link into its lower locking position thereby entrapping the securing projection 194. It is noted that only one abutment element will be pivoted by the securing projection, depending upon the direction in which the cart is moving; the other abutment element acts as a stop to further movement of the cart which allows the entrapment of the securing projection to occur.

Two very distinct advantages are achieved by the articulated three-part abutment element illustrated. First, because the projection engagement link 174 is relatively short, it pivots over a short radius as measured from the pivot axis which would coincide with the longitudinal axis of the small shaft 178, FIGS. 5 and 12, so that there is no interference between the projection engagement link and the securing projection when the former is rotated; that is, the projection engagement links pivot upward and away from the securing projection so that there is no contact between surfaces on the securing projection and the projection engagement links. The second major advantage is that once in the lower locking position, any engagement between the cross member of the securing projection 194 and the wall 198 sets up a force pattern which finds the pins 176, 172 and the shaft 80 in an "over center" alignment, so that there is no tendency for the links to pivot. In fact, the force pattern acts to reinforce the locking arrangement.

Figure 14:
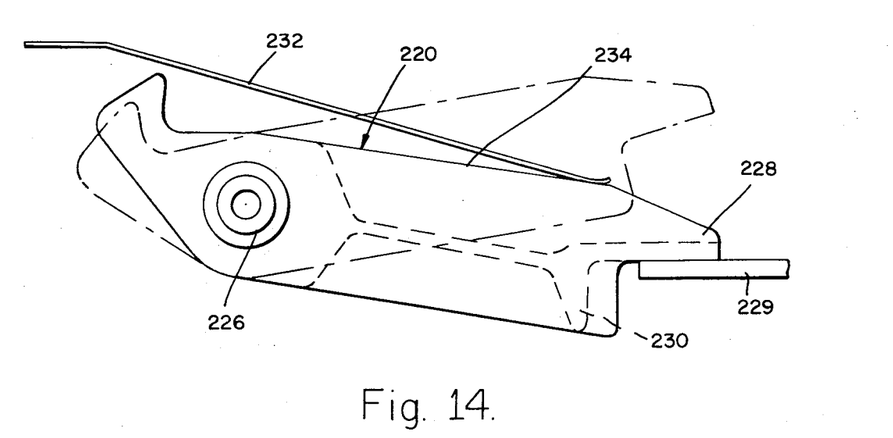
FIG. 14 is an elevational view of another embodiment of a portion of the retention system.
Figure 15:
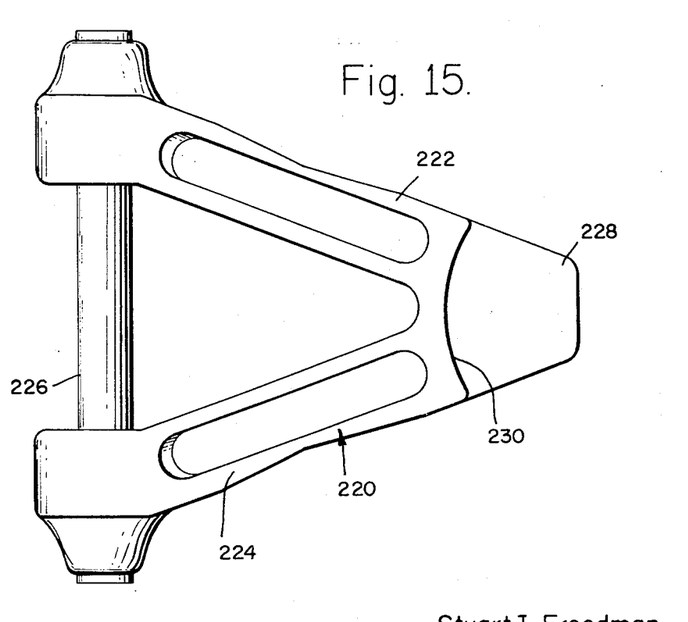
FIG. 15 is a plan view of the embodiment of the retention system portion shown in FIG. 14.

Referring now to FIGS. 14 and 15, there is illustrated a second abutment element embodiment 220. The abutment element 220 is triangularly shaped, having two legs 222, 224 which terminate so as to be pivotally mounted about a shaft 226 forming the third side of the triangle. The shaft 226 is analogous to the shafts 78 or 80 and is fixed to the base so that pivoting of the abutment element occurs about an axis coincident with the longitudinal axis of the shaft 226. The legs 222, 224 come together to form a flange 228 and an abutment surface 230. The flange 228 is designed to abut a stop element 229 connected to the base so as to limit further downward pivoting movement of the abutment element 220 while the abutment surface 230 is designed to engage the securing projection to prevent lateral movement of the cart. As clearly shown in FIG. 14, the abutment element 220 is movable between a lower locking position (shown in solid line) and an upper release position (shown in phantom line). To keep the abutment element biased to the lower locking position, a leaf spring 232 is provided which bears against an upper surface 234 of the abutment element with one end and is connected to the base at its other end.

It is to be understood that while the abutment elements 160, 162 are formed in three parts and the abutment element 220 is a one-piece structure, they are functionally similar and operate in a similar manner. The scope and spirit of the appended claims herein intend to include both embodiments of the abutment element as part of the present invention. It is, of course, understood that as with the oppositely disposed abutment elements 160, 162 there is an identical and oppositely disposed abutment element (not shown) relative the abutment element 220. It is to be understood that while the cart described is hand operated because of the position of the handles, the handles may be relocated to allow foot operation. A foot operated cart is considered an equivalent structure as is a cart not operating on the "deadman" principle; that is, a cart which is not in a restrained position while at rest with the operator away from the cart. The cart can be designed to be freely movable until purposefully braked, and the brake may be applied by hand or foot.

Figure 16:
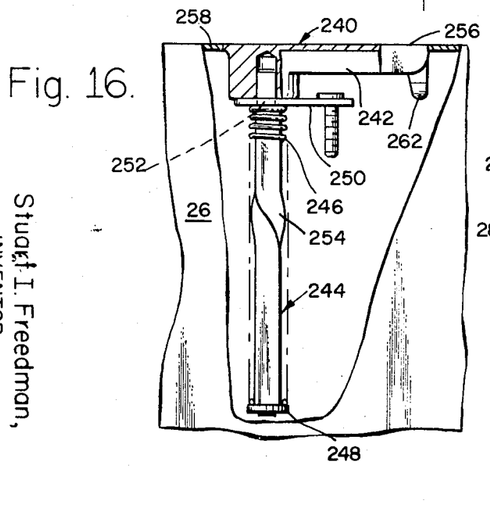
FIG. 16 is a broken away elevational view of the door latch taken within the circle 16—16 of FIG. 1.

In accordance with still another important aspect of the present invention, provision is made for locking the end panel door 26 (FIG. 1) into position immediately adjacent and parallel to the side panel 24. Provision is also made for easily releasing the end panel door. This is all accomplished by a latch 240, FIG. 16, including a hook portion 242, a twisted shaft 244, and a spring 246 which is positioned about the shaft 244. Retaining the spring in position is a washer 248 connected at one end portion of the shaft 244 and a plate 250 attached to the cart adjacent the other end portion of the shaft. The plate 250 has a square cross section aperture 252 which is adapted to receive the shaft 244 which also has a square cross section. Intermediate the shaft's ends is a 90° twist (the twist being designated 254). In the position shown, the upper surface 256 of the hook portion 242 is flush with the upper surface 258 of the end panel door.

In FIG. 1, the door is in its closed position, the latch 240 being disposed within the door so that the hook portion 242 extends in a direction generally parallel to the direction of the handle 40. When the door is opened and rotated through 270° so as to be adjacent the side panel 24 of the cart, the hook portion of the latch resides in a position generally perpendicular to the handle 40. In operation, once the door has been opened, the hook portion is grasped by an operator of the cart and lifted to a level slightly above the top panel 22 of the cart. Because of the placement of the stationary plate 250, having the square aperture 252, as the hook portion is raised the shaft will rotate through 90° in order to have the twist portion 254 pass through the square aperture. The 90° rotation again places the hook portion generally parallel to the handle 40 so as to have it positioned between the guard rail 34 and the top panel 22. In the meantime, the spring 246 has been compressed between the plate 250 and the washer 248 so as to provide a biasing force to return the shaft and hook portions to the position shown in FIG. 16. By relieving the force on the hook portion, the spring will cause the hook portion to come into engagement with the top panel 22. It is noted that the top panel 22 includes a ridge 260, which abuts an arm portion 262 of the hook portion. When it is desired to release the door from its position adjacent the side position adjacent the side panel, the hook portion is simply lifted so that the arm portion 262 disengages from the ridge 260 and then the spring is allowed to bias the shaft and the hook portion downwardly into the door.

Figure 17:
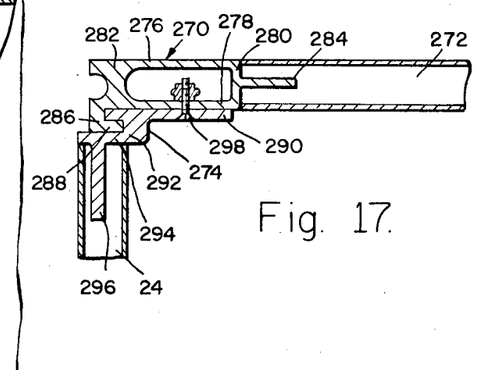
FIG. 17 is an elevational sectional view of extruded panel connectors taken along line 17—17 of FIG. 1.

In accordance with yet another important aspect of the present invention, provision is made to economically and easily connect structural panels of the cart in a lightweight yet strong arrangement. This is accomplished by providing two extruded panel connectors. A top connector 270 which is connected to a panel 272 forms a base for the top panel 22. A second extruded connector 274 is connected to the side panel 24 and is so structured that when the two extruded connectors 270, 274 are connected, the panels 24, 272 are disposed at right angles. The panels may be of honeycomb design to achieve a lightweight yet high-strength structure. The connector 270 has a generally rectangular cross section with two long sides 276, 278 and two short sides 280, 282. An arm 284 extends perpendicular from the short side 280 and is integral therewith and provides a structure for bonding the panel 272 to the connector 270. A hook portion having a first arm 286 extends away from the short side 282 and is generally perpendicular to the long side 278. A second integral arm 288 extends perpendicular to the first arm 286 and is generally parallel to the long side 278 so that a hook is formed. The connector 274 has an arm portion 290 which extends substantially the length of the side 278 and is adapted to abut the long side 278. The arm 290 also forms one leg of a generally U-shaped configuration which includes a base 292 and a second leg 294. Connected to the second leg 294 and extending perpendicular therefrom is an arm 296 which similar to the arm 284 allows the panel 24 to be bonded to the connector 274. The U-shaped configuration comprising the arm 290, the base 292 and the arm 294 forms a receptacle for the second arm 288, while the long side 278, the first arm 286 and the second arm 288 form a receptacle for the end of the arm 290, thereby achieving an interlocking relationship. A fastener 298 may be used to retain the position of the connectors in abutment.

The extruded connectors 270, 274 provide a strong, lightweight means of fastening two panels at generally right angles; in addition, the connectors are very economically produced. The connectors do not hamper at all the aesthetic designing of the cart and yet allow extremely economical cart fabrication methods to be used.

I claim:

1. A brake and retention system for a cart comprising:
   a. a shaft adapted to be rotatably connected to a base of said cart;
   b. a brake arm pivotably mounted to said shaft, said arm having an extended end for selectively frictionally engaging a cart supporting surface;
   c. an abutment element mounted to said shaft and pivotable between a lower locking position and an upper release position, said abutment element for abutting a securing projection when in said lower locking position;
   d. biasing means connected to said brake arm for biasing said brake arm to have said end frictionally engage said cart supporting surface;
   e. biasing means connected to said abutment element for biasing said abutment element to said lower locking position;
   f. means connected to said shaft for transmitting rotational motion to said shaft; and
   g. handle means connected to said motion transmitting means for pivoting said brake arm to disengage said arm from said cart supporting surface and for pivoting said abutment element to its upper release position.

2. A brake and retention system as claimed in claim 1 including:
   means connected to said shaft for engaging said brake arm and for moving said arm in a preselected manner; and
   means connected to said shaft for engaging said abutment element and for moving said abutment element in a preselected manner.

3. A brake and retention system as claimed in claim 2 wherein said motion transmitting means comprises a cable and each of said biasing means comprises a spring.

4. A brake and retention system as claimed in claim 3 wherein said handle means comprises an elongated, generally horizontally disposed handle, mounted to an upper portion of said cart and connected to said cable, said handle pivotable between at least three positions, a first position in which said brake arm end frictionally engages said cart supporting surface and said abutment element is in the lower locking position, a second position in which said brake arm end is disengaged from said cart supporting surface and said abutment element is in the lower locking position, and a third position in which said brake arm end is disengaged from said cart supporting surface and said abutment element is in the upper release position.

5. A brake and retention system as claimed in claim 4 including:
   a. a second shaft adapted to be rotatably connected to said base and disposed generally parallel to said first mentioned shaft;
   b. three additional brake arms, two of said brake arms mounted to said first mentioned shaft and two of said brake arms mounted to said second shaft;
   c. a second abutment element, oppositely disposed from said first mentioned abutment element, said second abutment element mounted to said second shaft;
   d. a second spring connected to said second abutment element;
   e. three additional springs, one connected to each of said three additional brake arms;
   f. a second cable connected to said second shaft; and
   g. a second handle connected to said second cable.

6. A brake and retention system as claimed in claim 5 including two cable adjustment mechanisms one connected to each of said shafts, and each of said mechanism comprising:
   a. first and second tubular members having outer generally cylindrical surfaces, each tubular member adapted to engage the other along the abutting ends, said abutting ends lying along a plane disposed oblique to the longitudinal axes of said abutting members, said second tubular member having at least a portion of its interior wall threaded;
   b. a wheel connected to said first tubular member at the other of its ends; and
   c. a threaded bolt having a head portion and a threaded shank portion extending through said first and second tubular members and adapted to engage said first tubular member with said head portion and said second tubular member along its threaded interior wall with said shank portion.

7. A brake system for a cart comprising:
   a. a brake arm pivotally mounted to a base of said cart near one end thereof and having an extended end for selectively frictionally engaging a cart supporting surface;
   b. a second brake arm pivotally mounted to a base of said cart near another end thereof and having an extended end for selectively frictionally engaging a cart supporting surface;
   c. biasing means connected to said brake arms and said base for normally biasing the end of said arms to frictionally engage said surface;
   d. a pair of handle means connected to said cart near opposite ends, said handle means comprising an elongated, generally horizontally disposed handle, pivotably mounted to an upper portion of said cart; and e. transmitting means connected to said handle for selectively transmitting rotational motion from said handle to said brake arm said transmitting means including a recessed wheel to which is attached one end portion of a cable, said other end portion being attached to said handle.

8. A brake system for a cart comprising:
 a. two spaced apart, parallel disposed, shafts each rotatably connected to said base;
 b. a brake arm pivotably mounted to a base of said cart and having an extended end for selectively frictionally engaging a cart supporting surface;
 c. three additional brake arms, two of said brake arms mounted to each of said shafts, and each of said arms having an extended end for selectively frictionally engaging a cart supporting surface;
 d. biasing means connected to said brake arm and said base for normally biasing said brake arm to have said end frictionally engage said cart supporting surface;
 e. two wheels, one of said wheels connected to one of said shafts and the other of said wheels connected to the other of said shafts;
 f. two lengths of cable, one end portion of one of said lengths of cable being attached to one of said wheels, one end portion of the other of said cables attached to the other of said wheels;
 g. means connected to each of said shafts for engaging said brake arms and moving said arms in a preselected manner;
 h. handle means connected to said cart for pivoting said brake arm to disengage said end from said cart supporting surface, said handle means comprising two elongated generally horizontally disposed handles, each of said handles pivotally mounted to an upper portion of said cart, one of said handles located at one end of said cart and the other of said handles located at the other end of said cart, and one of said handles connected to the other end portion of one of said cable lengths, the other of said handles connected to the other end portion of the other of said cable lengths, whereby rotational movement of said handles are transmitted by said cable lengths to said shafts by said wheels to cause said brake arms to be pivoted.

9. A brake system as claimed in claim 8 including an elongated rod pivotally connected at one end to one of said shafts and at the other end to the other of said shafts whereby rotation in one direction of one of said shafts causes a rotation in the opposite direction of the other of said shafts.

10. A brake system as claimed in claim 9 wherein said brake arm engaging and moving means comprise four annular elements with each element having a portion at a first width dimension and a portion at a second width dimension, each of said elements mounted and rigidly attached to a shaft adjacent a corresponding one of said brake arms and rotatable with said shaft to engage with a surface formed on said element which is contiguous with each of the first width and second width portions, a surface on said brake arm to rotate said arm in a first direction, each of said annular elements allowing its corresponding brake arm to rotate in a direction opposite said first direction along the portion of the first width without interference.

11. A brake system as claimed in claim 10 wherein the two brake arms mounted to one shaft are oppositely disposed from the two brake arms mounted on said other shafts; and including
 a first flexible connector connecting one brake arm on one shaft to the oppositely disposed brake arm of said other shaft; and
 a second flexible connector connecting the other brake arm on said one shaft to the oppositely disposed brake arm of said other shaft whereby undesirable movement by said cart in a first direction causes said brake arms on one shaft to rotate and lift a portion of said cart away from the cart supporting surface, the brake arms causing lifting also rotating with said flexible connectors the brake arms on said other shaft to a position out of engagement with said cart supporting surface.

12. A retention system for a cart to releasably lock said cart to a securing projection comprising:
 a. an abutment element adapted to be mounted to a base of said cart and pivotable between a lower locking position and an upper release position, said abutment element for abutting a securing projection when in said lower locking position;
 b. biasing means connected to said abutment element for biasing said abutment element to said lower locking position; and
 c. handle means connected to said cart for pivoting said abutment element away from said securing projection to said upper release position;
 whereby when locking said cart to said securing projection, said securing projection pivots said abutment element to said upper position and said biasing means returns said abutment element to said lower position when said abutment element is no longer biased by said securing projection and whereby said handle means is pivoted to move said abutment element from a lower lock position to the upper release position to release said cart from said securing projection.

13. A retention system as claim in claim 12 including a shaft rotatably connected to said base, said abutment element being mounted to said shaft; and
 means connected to said shaft for engaging said abutment element and moving said abutment element in a preselected manner.

14. A retention system as claimed in claim 13 including
 a converging guide member adapted to be connected to said base for guiding said cart toward said securing projection when said cart is to be locked to said securing projection.

15. A retention system as claimed in claim 14 including
 said handle means comprise an elongated, generally horizontally disposed handle, pivotally mounted to an upper portion of said cart; and including
 means connected to said handle for selectively transmitting rotational motion from said handle to said abutment element.

16. A retention system as claimed in claim 12 including:
 a. two spaced apart parallel disposed, shafts each adapted to be rotatably connected to said base;
 b. an abutment element mounted to each of said shafts;

c. two wheels, one of said wheels connected to one of said shafts and the other of said wheels connected to the other of said shafts;
d. two lengths of cable, one end portion of one of said lengths of cable being attached to one of said wheels, one end portion of the other of said cables attached to the other of said wheels;
e. means connected to each of said shafts for engaging said abutment elements and moving said abutment elements in a preselected manner;
f. said handle means comprises two elongated generally horizontally disposed handles, each of said handles pivotally mounted to an upper portion of said cart, one of said handles located at one end of said cart and the other of said handles located at the other end of said cart, and one of said handles connected to the other end portion of one of said cable lengths, the other of said handles connected to the other end portion of the other of said cable lengths;

whereby rotational motion of said handles are transmitted by said cable lengths to said shafts by said wheels to cause said abutment elements to be pivoted.

17. A retention system as claimed in claim 16 wherein each of said abutment elements is articulate and comprise:
  a projection activated arm pivotally connected to a shaft;
  a connecting link pivotally connected to said projection activated arm; and
  a projection engagement link pivotally connected at one end to said connecting link and at its other end to said base, said projection engagement link having a surface for contacting said securing projection, whereby said projection engagement link is pivoted by the pivoting of said projection activated arm and said connecting link, and said surface of said projection engagement link is spaced closely to said other end of said projection engagement link so as to have a short pivot radius.

* * * * *